Patented Feb. 12, 1952

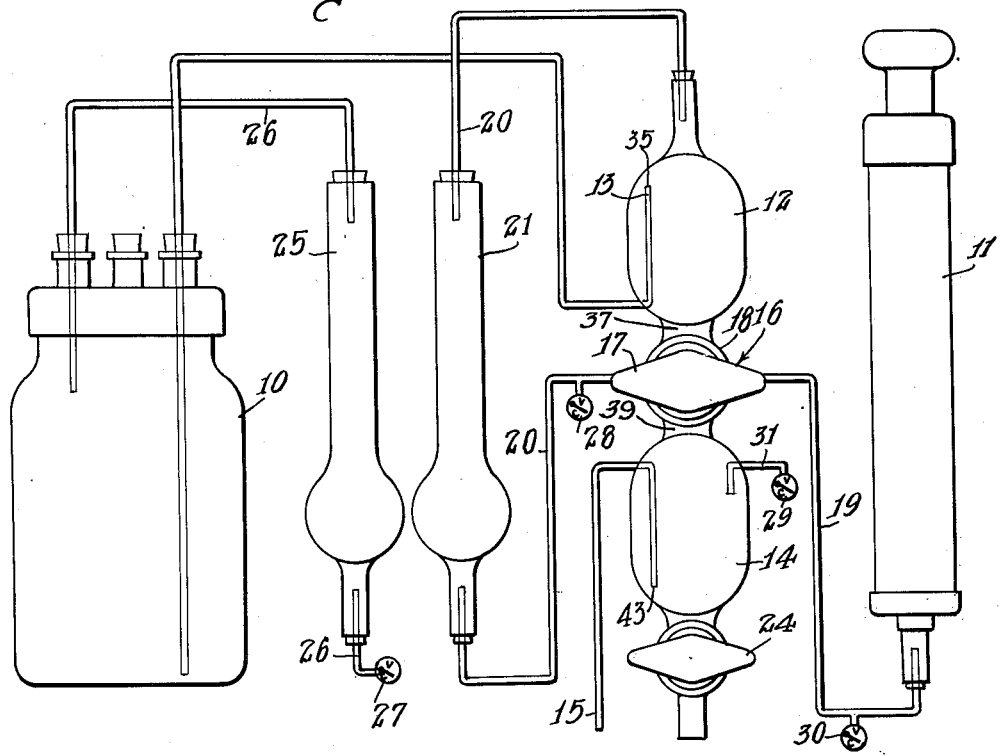

2,585,314

UNITED STATES PATENT OFFICE 2,585,314

GAS ANALYSIS APPARATUS

Leland S. Hazeltine and Le Roy A. Stanfield,
Los Angeles, Calif.

Application August 12, 1946, Serial No. 689,924

5 Claims. (Cl. 23—254)

The present invention relates to a method and apparatus for analyzing gas.

In the interests of safety and efficient fuel consumption, it is desirable to ascertain quickly and readily the degree of combustion of fuel in some instances, and in other instances to ascertain whether or not there is undesirable leakage of the products of combustion into, for example, the hot air ducts or registers in a gas-hot air heating system. Such leakage of the products of combustion into the registers or hot air ducts, as is well recognized, may produce harmful results on persons within the heated area.

It is therefore an object of the present invention to provide an improved method and apparatus for analyzing a gas characterized by the ease, simplicity and rapidity with which results may be obtained.

Commercial gas companies, as a part of their service to consumers, determine the presence of leakage of products of combustion into the hot air ducts or registers of gas operated heating systems. This service requires a large personnel, especially when the gas company serves a large locality. It is desirable in such instances that a determination as to leakage be made accurately with a minimum personnel who require but little training.

It is therefore another object of the present invention to provide improved gas analysis apparatus for determining undesired leakage of products of combustion, successful operation of which requires a relatively short time by unskilled personnel to obtain accurate results.

Furthermore, since the gas analysis apparatus requires that it be carried to different places within the locality served by the gas company, it is desirable that the apparatus be readily portable and rugged to withstand transportation in automobiles and trucks wherein it may be subjected to expected and unexpected abuse.

It is therefore another object of the present invention to provide an improved gas analysis apparatus which is portable, rugged and yet produces accurate results by manipulation of unskilled personnel.

While the apparatus is shown in a specific use to determine the presence and amount of a product of combustion in the hot air duct, register or pipe of a hot air-gas operated heating system, it will be apparent to those skilled in the art, with the teachings contained herein, that the complete apparatus described or portions thereof may find a greater utility.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

Figure 1 shows apparatus arranged to practice the method of my invention and to obtain desirable results from the particular arrangement of elements.

Figures 2 and 3 represent in schematic form the relative positions of the channels through the valve body and associated valve control element in a valve structure shown in Figure 1, the dotted lines in Figure 2 indicating those channels which are interconnected in the "A," "B" and "C" valve positions. Thus channels 19 and 20 are interconnected in the "A" position, channels 37 and 39 in the "B" position, and channels 19 and 39 in the "C" position.

Figure 4 is a view in elevation of the multiple valve control element or plug in the valve structure shown structurally in Figure 1 and in diagrammatic form in Figure 3.

Figure 5 is a view in end elevation of the valve control element or plug shown in Figure 4.

Figures 6 and 7 are sectional views taken substantially on lines 6—6 and 7—7, respectively, in Figure 4.

Figure 8 is a sectional view taken substantially on lines 8—8 of Figure 5.

In accordance with the principles of the present invention, a predetermined quantity of gas absorbing liquid is subjected to a predetermined quantity of a gaseous mixture by passing such mixture through the liquid thereby to determine the presence and amount of a gas which might be present in such mixture. The gas, in which present interest is manifested, is carbon dioxide, and the liquid is strontium hydroxide to which an indicator, such as phenolphthalein, is added. In case there is more than a predetermined amount of carbon dioxide in the gaseous mixture, the strontium hydroxide solution changes color thereby to provide a suitable indication of the presence of more than a predetermined quantity of carbon dioxide in the gaseous mixture. Carbon dioxide of course is a combustion product when commercial gas is burned, for example, in hot air-gas operated heating systems. The presence of more than a predetermined amount of carbon dioxide in the air ducts or registers of such a heating system indicates the fact that there is a leakage of the gas combustion products into the air ducts or registers. Although it is desirable in this particular instance to determine such leakage by determining the amount of carbon dioxide present, such leakage may, of course, be determined by the presence of other gases, such as carbon monoxide, in the air ducts or registers.

In accordance with the present invention, a gas absorbing liquid normally stored in a storage chamber 10 is transferred by vacuum pump or vacuum means 11 to a measuring chamber 12 through a combination liquid filling and overflow tube 13 within the chamber 12. After a predetermined amount of gas testing liquid is thus transferred to the measuring chamber 12 determined by the vertical height of tube 13, such predetermined quantity of liquid is allowed to flow by gravity forces acting thereon into the sampling or absorption chamber 14 through which a gas mixture passing upwardly through the sampling tube or sampling line 15 may be bubbled.

The three-way valve 16 serves to selectively interconnect the measuring chamber 12, sampling or absorption chamber 14 and vacuum pump or vacuum means 11 all within a 90° rotational movement of the multiple valve control element or valve plug 17 which is movable within the valve body 18. In operation the valve is positioned in the "A," "B" and "C" positions, in that order. In the first or "A" position of the multiple valve control element 17 shown in Figure 1 and shown in full lines in Figure 3, the vacuum line 19 is placed in communication only with the line 20 which has interposed therein a soda lime absorption tube 21, the upper end of tube 20 being in communication with the upper end of measuring chamber 12 thereby to apply a vacuum in the measuring chamber 12 when valve control element 17 is in the position shown in Figure 1 and when the vacuum pump 11 is actuated. This vacuum in chamber 12 results in flow of liquid from reservoir 10 to chamber 12. The vacuum pump 11 may take many forms and shapes, and in portable apparatus, to which this invention is particularly directed, the pump 11 is of the hand-operated type.

In the second or "B" position of the valve control element 17 shown in Figure 3, the measuring chamber 12 is placed in communication with the sampling chamber 14 to the exclusion of all other apparatus to allow the liquid to drain from chamber 12 to chamber 14. In the third or "C" position of the valve control element 17 shown in Figure 3, the vacuum pump or means 11 is placed in communication only with the sampling chamber 14 to the exclusion of other apparatus thereby to cause the gaseous mixture tested to be drawn and bubbled through the gas absorbing liquid present in chamber 14. After the liquid in chamber 14 is subjected to the bubbling action produced by the flow of a predetermined quantity of gaseous mixture determined in practice by counting the number of full strokes of the hand-operated vacuum pump 11, the color of the carbon dioxide absorbing liquid, strontium hydroxide, is noted. In the event that the liquid in the chamber 14 is of substantially the same color as the liquid in the storage chamber 10, the gaseous mixture tested from the air ducts or registers in the heating system is sufficiently free from the products of combustion, and hence there is little or no undesired leakage of the products of combustion into such air ducts or registers. Conversely, in the event the liquid in the chamber 14 changes color after being subjected to a predetermined quantity of the tested gaseous mixture, there is strong evidence that there is leakage of the products of combustion into the air ducts or registers.

After the predetermined quantity of gas testing liquid in chamber 14 is subjected to a predetermined quantity of gaseous mixture, the gas testing liquid in the chamber 14 is allowed to drain into a waste solution receptacle or into the atmosphere by opening the valve 24 and then closing said valve 24 thereby to allow another cycle of operation.

The strontium hydroxide solution in storage chamber 10 is desirably a .0004 normal solution to which eight drops of phenolphthalein are added per pint of liquid. Preferably the apparatus is protected from moisture in the air which might otherwise be drawn in upon actuation of the hand-operated pump 11 by means of a pair of soda lime water absorbing tubes 21 and 25. The soda lime tube 21 is interposed in a line with tube 20, and the soda lime tube 25 being interposed in a line with tube 26, which serves to place the upper level of the liquid in chamber 10 at atmospheric pressure.

One side of the soda lime tube 25 is vented to the atmosphere through check valve 27 which is used to prevent outside air from contacting the solution in chamber 10 when the apparatus is not in use. Also, one side of soda lime tube 21 is vented to the air through the normally open check valve 28 which serves to place the upper level of the liquid in chamber 12 at substantially atmospheric pressure when the liquid in chamber 12 is allowed to drain into chamber 14 in the "B" position of valve 16. In the "A" position of the valve, this check valve 28 is automatically closed in response to subatmospheric pressures in line 20 occasioned by operation of the pump 11, to allow liquid to be drawn from reservoir 10 to the measuring chamber 12 to a level therein slightly above the tube end 35; then, after the pump 11 is stopped, check valve 28 opens and excess liquid may flow back through line 13 until the level at 35 of the mouth of the tube is reached. Check valve 29 is mounted on the end of the vent tube 31 extending from sampling chamber 14 to close off the chamber 14 during the sampling cycle. Tube 31 acts as a vent and acts to allow any entrapped air to escape and thereby allow the liquid from the measuring chamber 12 to completely drain down into the sampling chamber 14 in the "B" position of valve 16. This check valve 29 is closed when subatmospheric pressures exist in the sampling chamber 14, as for example, when the valve 16 is in its "C" position and the vacuum pump 11 is operated. This valve 29 thus serves, in the "B" position of valve 16, to allow all of the fluid in the measuring chamber 12 to drain into the sampling chamber 14, and functions, in the "C" position of the valve, to assure bubbling of the gas sample through the liquid in the sampling chamber 14. Check valve 30 is connected in communication with vacuum pump 11 to allow normal operation thereof in conventional manner.

It is noted that the measuring chamber 12, three-way valve 16, sampling chamber 14 and the drain valve 24 are of Pyrex glass welded into one integral unit. Within the measuring chamber 12 the combination liquid filling and overflow tube 13 extends vertically a distance sufficiently far to allow approximately 20 cubic centimeters of gas testing liquid, strontium hydroxide, to remain in the measuring chamber 12 and not more than such amount after cessation of operation of pump 11 when the valve 16 is in its "A" position. Any excess of liquid in chamber 12 will drain back into the storage pump 10 inasmuch as the measuring chamber 12 is at a position above the storage chamber 10. The orifice 35 at the end of tube 13 is of such size to control the rate at which liquid flows from the storage chamber 10 into the measuring chamber 12 so as to avoid undue splashing of the liquid into, for example, soda lime tube 21.

The valve 16 is preferably of the construction shown wherein the valve element 17 need be moved but a relatively slight amount in order to place the various parts of the apparatus in communication. The valve body 18 has four equally spaced tubular connections thereto, 37, 38, 19 and 20 (Figure 2). The connections 19, 20 are aligned but are lower, as viewed in Figure 1, than are the other two aligned connections 37, 39. The tubular portion 37 serves to connect measuring chamber 12 with valve 16; the tubular portion 19 serves to connect the valve 16 with the pump 11; the tubular portion 39 serves to connect the valve 16 with the sampling chamber 14; while the tubular portion 20 serves to connect the valve 16 to the measuring chamber 12 through the interposed soda lime tube 21. The movable valve control element or plug 17 has three channels therein, 40, 41 and 42, shown in Figures 4 to 8, inclusive, for selectively connecting various ones of the tubular portions 37, 38, 39 and 20 in communication to achieve the results indicated in Figure 2.

Valve control element 17 in its "A" position shown in Figure 1 and full line position shown in Figure 3 has its channel 40 extending between the tubular portions 19 and 20 thereby to connect the pump 11 to the measuring chamber 12 through the absorption tube 21. Valve control element 17 in its position indicated as "B" in Figure 3 has its channel 42 extending therethrough in communication with the tubular portions 37 and 39 thereby to allow liquid in measuring chamber 12 to flow by gravity forces acting thereon into the sampling chamber 14. Valve control element 17 in its position indicated as "C" in Figure 3 has its channel 41 in communication with the tubular portions 19 and 39 thereby to produce a vacuum in sampling chamber 14 and resulting bubbling of the gaseous mixture to be tested through the liquid contained in chamber 14 when the pump 11 is actuated.

The rate at which gaseous mixture is bubbled up through the liquid contained in the sampling chamber 14 may be controlled by the size of the orifice 43 at the end of the tube 15. The associated tube 31 preferably enters the sampling chamber 14 in such a manner that there is little likelihood of liquid draining down from valve 16 from entering the tube 31. The check valves 29 and 30 are normally closed while the other check valves 27 and 28 are normally open.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. The combination, in a gas analysis apparatus arranged to determine the presence and amount of gas in a mixture by absorbing such gas in a gas absorbing fluid, a fluid storage chamber, a measuring chamber connected to said storage chamber, a sampling chamber, said measuring chamber having an overflow tube therein, an opening in said measuring chamber located above said overflow tube, vacuum means, a single control valve having first passageway means connecting said vacuum means to said opening to apply a vacuum to said measuring chamber, the upper end of the overflow tube being above the fluid level in said storage chamber, said sampling chamber being below said measuring chamber, said control valve having second passageway means interconnecting said sampling chamber with said measuring chamber, said sampling chamber having a mixture entering tube at the bottom thereof, and said control valve having third passageway means interconnecting said vacuum means with said sampling chamber.

2. The combination, in gas analysis apparatus arranged to determine the presence and amount of gas in a mixture by absorbing such gas in a gas absorbing fluid, a fluid storage chamber vented to the atmosphere, a fluid measuring chamber having an overflow tube therein, an opening to said measuring chamber above said overflow tube and a fluid exit opening therein below said overflow tube, conduit means connected to said overflow tube and extending within and below the fluid level in said storage chamber, the upper end of the overflow tube being above the fluid level in the storage chamber, suction producing means, a single control valve having first passageway means interconnecting said suction producing means with said opening in said measuring chamber, a sampling chamber disposed below said measuring chamber, said control valve having second passageway means interconnecting said measuring chamber with said sampling chamber, said sampling chamber having a gas sampling tube extending downwardly therein to a point below the fluid level therein, and said control valve having third passageway means interconnecting said sampling chamber with said suction producing means.

3. The combination, in gas analysis apparatus arranged to determine the presence and amount of gas in a mixture by absorbing such gas in a gas absorbing liquid, a liquid storage chamber vented to the atmosphere, a liquid measuring chamber having an overflow tube therein, an opening to said measuring chamber above said overflow tube and a liquid exit opening therein below said overflow tube, conduit means connected to said overflow tube and extending within and below the liquid level in said storage chamber, the upper end of the overflow tube being above the liquid level in the storage chamber, suction producing means including a suction line, a line connected to said opening in said measuring chamber, a single control valve having first passageway means interconnecting said suction line with the last mentioned line, said last mentioned line being vented to the atmosphere through a check valve which is automatically closed upon the presence of subatmospheric pressures in said last mentioned line, a sampling chamber disposed below said measuring chamber, said control valve having second passageway means interconnecting said measuring chamber with said sampling chamber, said sampling chamber having a gas sampling tube extending downwardly therein to a point below the liquid level therein, and said control valve having third passageway means interconnecting said sampling chamber with said suction producing means.

4. The combination, in gas analysis apparatus arranged to determine the presence and amount of gas in a mixture by absorbing such gas in a gas absorbing liquid, a liquid storage chamber vented to the atmosphere, a liquid measuring chamber having an overflow tube therein, an opening to said measuring chamber above said overflow tube and a liquid exit opening therein below said overflow tube, conduit means connected to said overflow tube and extending within and below the liquid level in said storage chamber, the upper end of the overflow tube being above the liquid level in the storage chamber, suction producing means, a single control valve having first passageway means interconnecting said suction producing means with said opening in said measuring chamber, a sampling chamber disposed below said measuring chamber, said control valve having second passageway means interconnecting said measuring chamber with said sampling chamber, said sampling chamber having a gas sampling tube extending downwardly therein to a point below the liquid level therein, a conduit extending into said sampling chamber and terminating above the liquid level therein, the last mentioned conduit being vented to the atmosphere through a check valve which is automatically closed upon the presence of subatmospheric pressures in said sampling chamber, and said control valve having third passageway means interconnecting said sampling chamber with said suction producing means.

5. The combination, in gas analysis apparatus arranged to determine the presence and amount of gas in a mixture by absorbing such gas in a gas absorbing liquid, a liquid storage chamber vented to the atmosphere, a liquid measuring chamber having an overflow tube therein, an opening to said measuring chamber above said overflow tube and a liquid exit opening therein below said overflow tube, conduit means connected to said overflow tube and extending within and below the liquid level in said storage chamber, the upper end of the overflow tube being above the liquid level in the storage chamber, suction producing means including a suction line, a line connected to said opening in said measuring chamber, a single control valve having first passageway means interconnecting said suction line with the last mentioned line, said last mentioned line being vented to the atmosphere through a check valve which is automatically closed upon the presence of subatmospheric pressures in said last mentioned line, a sampling chamber disposed below said measuring chamber, said control valve having second passageway means interconnecting said measuring chamber with said sampling chamber, said sampling chamber having a gas sampling tube extending downwardly therein to a point below the liquid level therein, a conduit extending into said sampling chamber and terminating above the liquid level therein, the last mentioned conduit being vented to the atmosphere through a check valve which is automatically closed upon the presence of subatmospheric pressures in said sampling chamber, and said control valve having third passageway means interconnecting said sampling chamber with said suction producing means.

LELAND S. HAZELTINE.
LE ROY A. STANFIELD.

REFERENCES CITED

The following references are of record in the file of this patent:

UNITED STATES PATENTS

| Number | Name | Date |
|---|---|---|
| 301,598 | Hunt | July 8, 1884 |
| 464,543 | Wolpert | Dec. 8, 1891 |
| 688,449 | Tutwiler | Dec. 10, 1901 |
| 744,132 | Tutwiler | Nov. 17, 1903 |
| 1,101,656 | Phelps | June 30, 1914 |
| 1,325,991 | King | Dec. 23, 1919 |
| 1,437,916 | Shelor | Dec. 5, 1922 |
| 1,448,901 | Moreland | Mar. 20, 1923 |
| 1,474,097 | Krogh et al. | Nov. 13, 1923 |
| 1,491,071 | Shelor | Apr. 22, 1924 |
| 1,690,470 | Bly | Nov. 6, 1928 |
| 1,753,675 | Wasson | Apr. 8, 1930 |
| 1,873,010 | Mitton | Aug. 23, 1932 |
| 2,047,526 | Thomas | July 14, 1936 |
| 2,370,703 | Zaichowsky | Mar. 6, 1945 |
| 2,434,723 | Shook | Jan. 20, 1948 |
| 2,448,206 | Bailey | Aug. 31, 1948 |

FOREIGN PATENTS

| Number | Country | Date |
|---|---|---|
| 106,265 | Great Britain | Mar. 10, 1921 |
| 379,409 | Germany | Aug. 22, 1923 |
| 350,584 | Great Britain | June 18, 1931 |
| 428,568 | Great Britain | May 15, 1935 |
| 539,709 | Great Britain | Sept. 22, 1941 |
| 684,784 | Germany | Nov. 9, 1939 |

OTHER REFERENCES

Shepherd, "Bureau of Standards Journal of Research," vol. 6, January 1931, pages 132–135.

Polis, Berger and Schrenk, "Bureau of Mines," R. I. 3785, Nov. 1944, page 3.